(12) United States Patent
Kobayashi

(10) Patent No.: US 7,796,754 B2
(45) Date of Patent: Sep. 14, 2010

(54) INFORMATION RECORDING PROCESSING APPARATUS, INFORMATION REPRODUCTION PROCESSING APPARATUS, INFORMATION RECORDING MEDIUM, INFORMATION RECORDING PROCESSING METHOD, INFORMATION REPRODUCTION PROCESSING METHOD, AND COMPUTER PROGRAM

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1048 days.

(21) Appl. No.: 10/971,968

(22) Filed: Oct. 22, 2004

(65) Prior Publication Data

US 2005/0089162 A1    Apr. 28, 2005

(30) Foreign Application Priority Data

Oct. 22, 2003    (JP) .......................... P2003-361504

(51) Int. Cl.
*H04N 7/167* (2006.01)
*G01R 31/28* (2006.01)

(52) U.S. Cl. ...................... 380/201; 714/728; 714/739; 714/758; 705/57; 705/58; 360/60

(58) Field of Classification Search ................ 380/201; 360/60; 714/728, 739, 758; 705/57, 58
See application file for complete search history.

(56) References Cited

U.S. PATENT DOCUMENTS

| | | | | |
|---|---|---|---|---|
| 6,104,279 | A * | 8/2000 | Maletsky | 340/10.41 |
| 6,262,967 | B1 * | 7/2001 | Kajiyama et al. | 369/275.4 |
| 6,353,890 | B1 * | 3/2002 | Newman | 713/193 |
| 2002/0159361 | A1 | 10/2002 | Tosaki et al. | |
| 2003/0065925 | A1 * | 4/2003 | Shindo et al. | 713/178 |
| 2003/0070082 | A1 | 4/2003 | Nimura et al. | |

(Continued)

FOREIGN PATENT DOCUMENTS

| | | |
|---|---|---|
| EP | 1 353 330 | 4/2003 |
| JP | 07-021688 | 1/1995 |
| JP | 09-055730 | 2/1997 |
| JP | 10-283270 | 10/1998 |
| JP | 2002-093058 | 3/2002 |
| JP | 2002-202719 | 7/2002 |
| WO | WO 2004/075187 | 9/2004 |

OTHER PUBLICATIONS

Thöing, Christian, "8th (Pseudo-) random generators", Cryptography, Sep. 21, 2001, 6 pages.

*Primary Examiner*—William R Korzuch
*Assistant Examiner*—Sarah Su
(74) *Attorney, Agent, or Firm*—K&L Gates LLP

(57) ABSTRACT

An information recording and/or reproduction processing apparatus is provided. The information recording and/or reproduction processing apparatus is provided by which additional information such as copy protection information is recorded as encrypted data on an information recording medium and also a cryptographic key is recorded such that the difficulty in analysis thereof is promoted. Where additional information such as copy protection information is encrypted and recorded and also a cryptographic key for the encrypted additional information is recorded together, a seed is generated based on an error correction code set corresponding to the additional information. Then, a scrambling or bit position conversion process in which random numbers generated based on the seed are applied is executed for the cryptographic key data, and resulting cryptographic key data is recorded on an information recording medium. Upon such recording, the additional information is recorded as pit information while the cryptographic key data is recorded as wobble data. The cryptographic key has an increased difficulty in analysis and allows achievement of an efficient data reproduction process.

30 Claims, 12 Drawing Sheets

U.S. PATENT DOCUMENTS

2003/0135798 A1* 7/2003 Katayama et al. ........... 714/710
2003/0185128 A1   10/2003 Shoji et al.
2003/0189884 A1* 10/2003 Yumiba et al. ........... 369/47.28
2004/0174802 A1*  9/2004 Suzuki ................... 369/275.3
2005/0165980 A1*  7/2005 Clayton et al. ................ 710/22
2008/0086676 A1*  4/2008 Mead ......................... 714/758

* cited by examiner

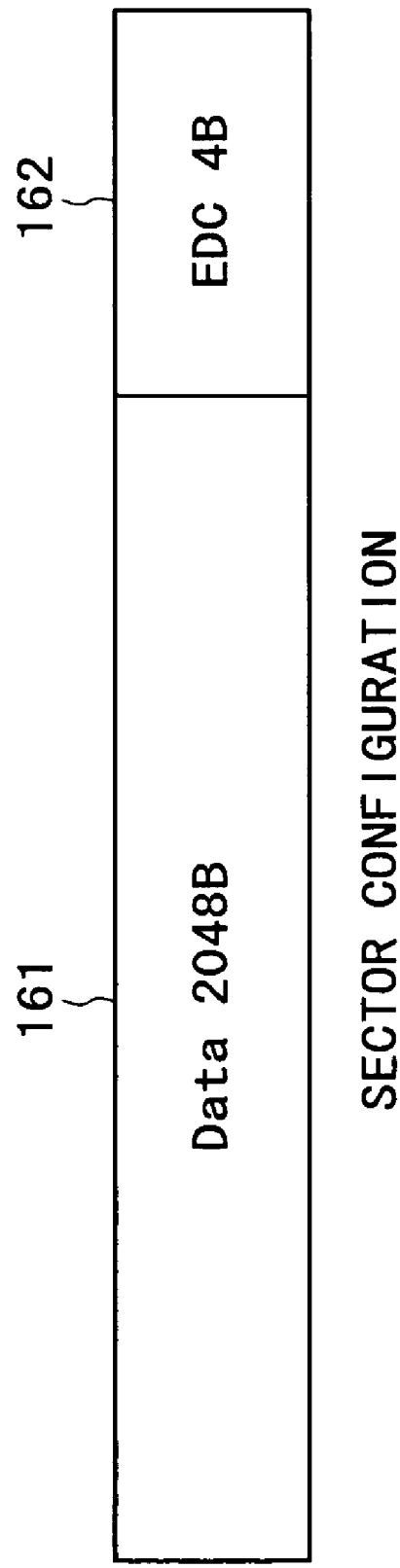

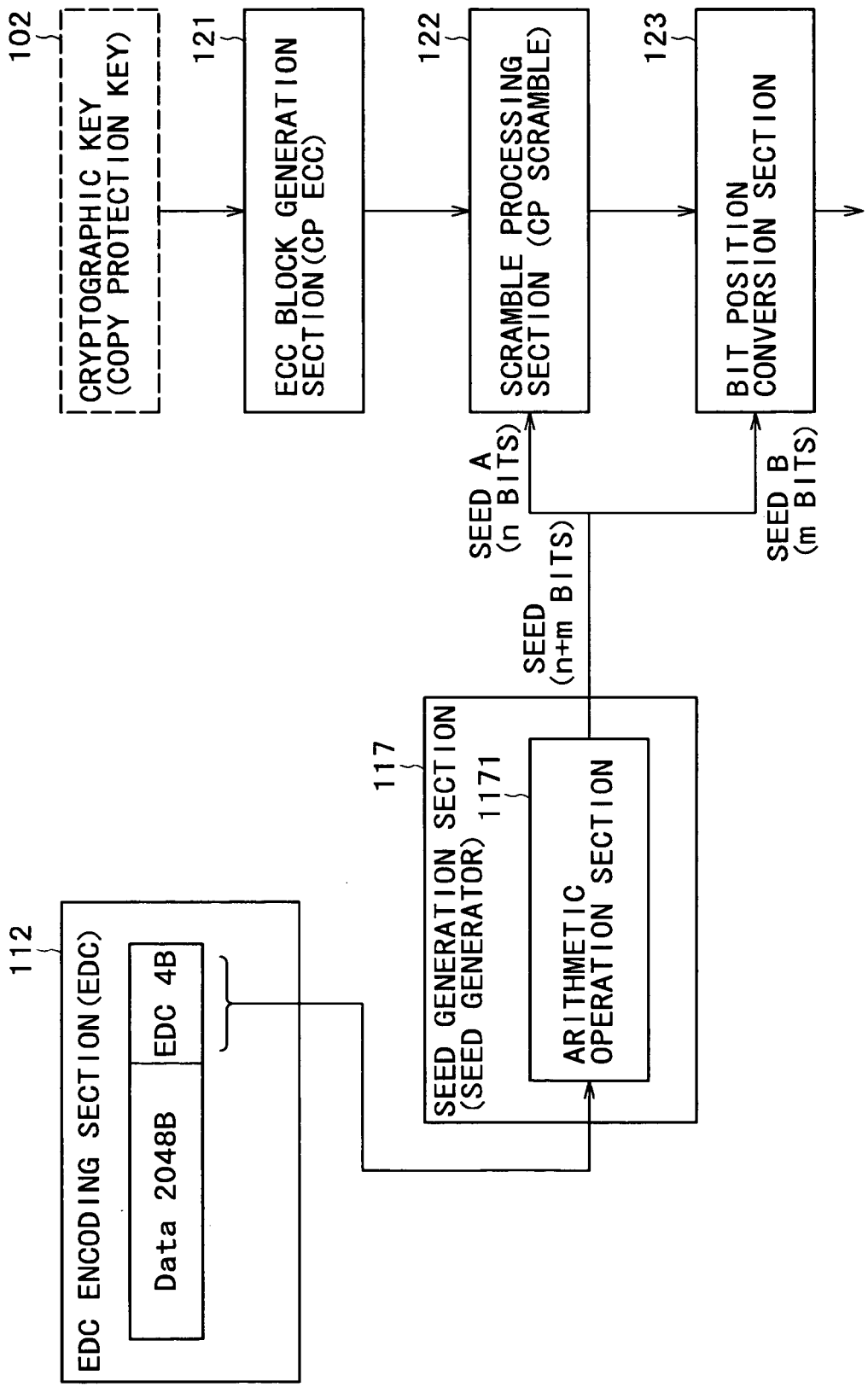

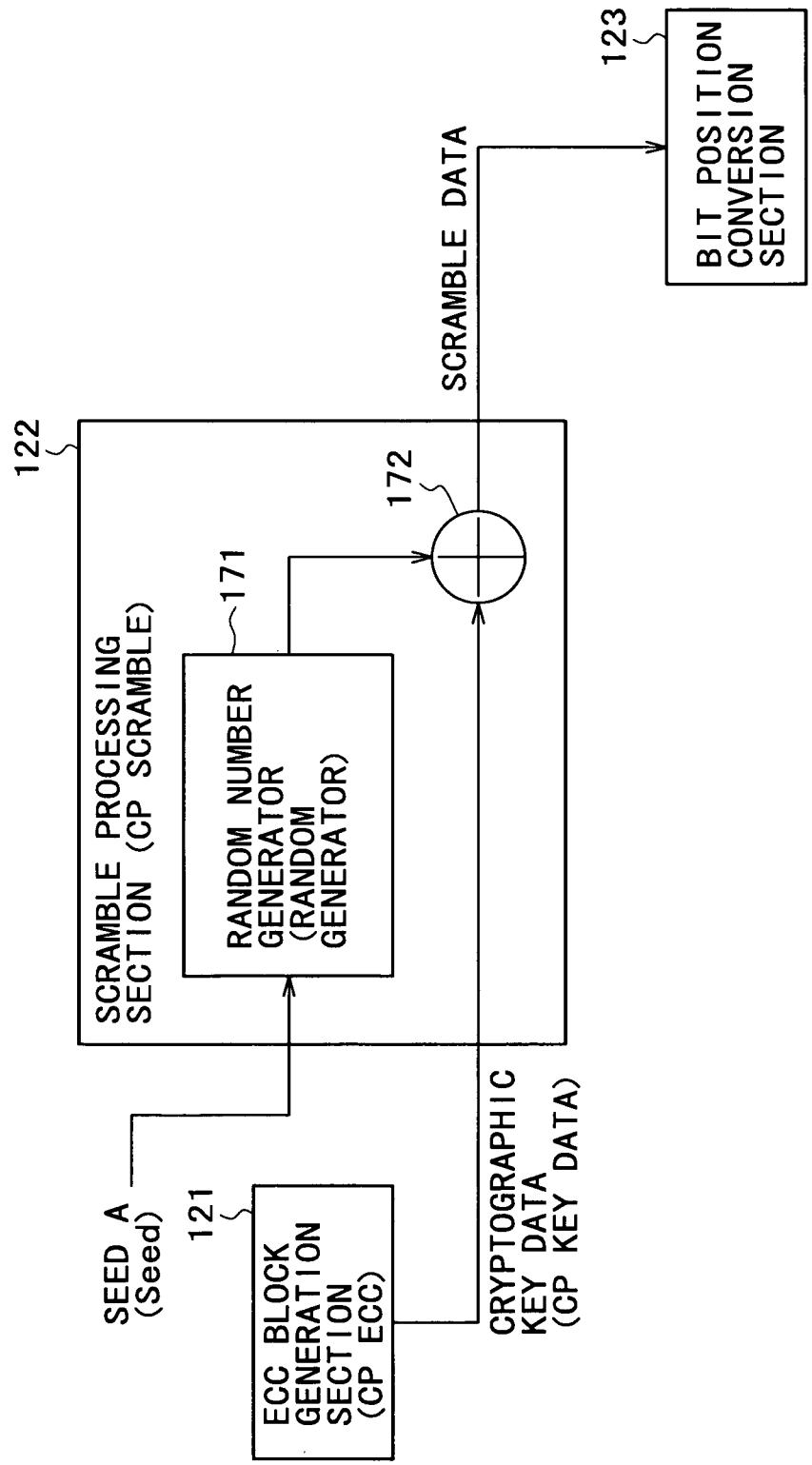

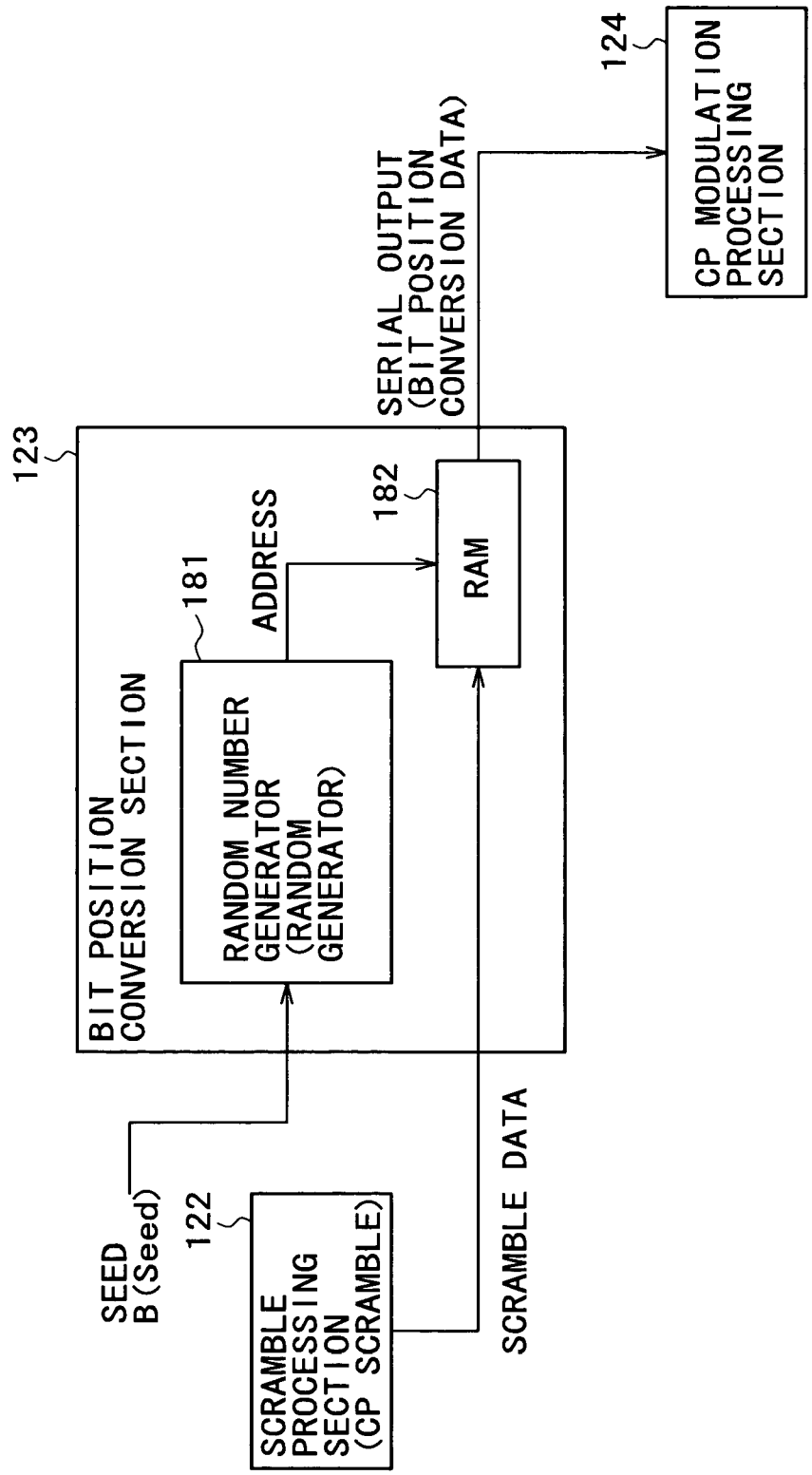

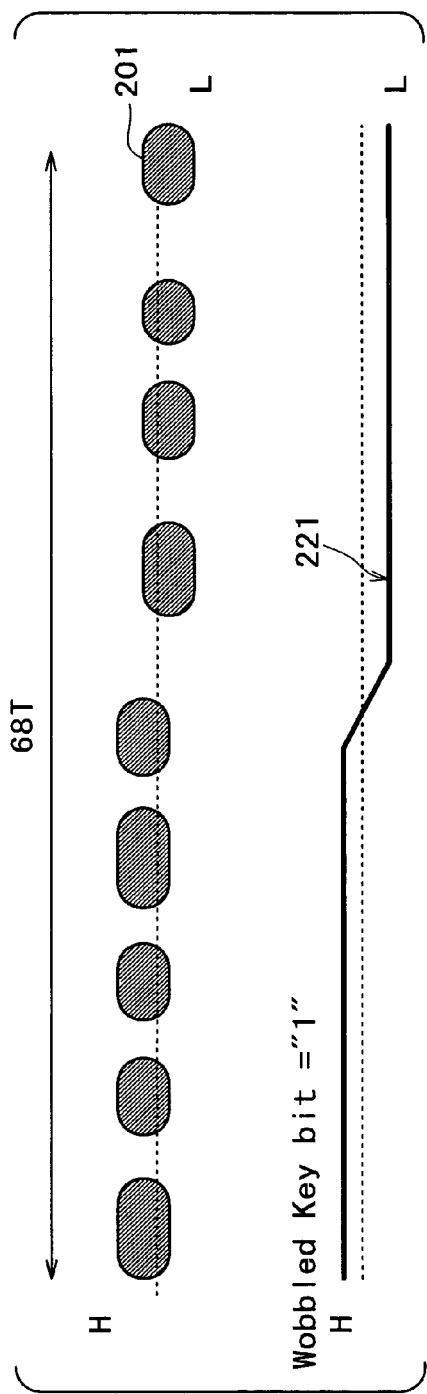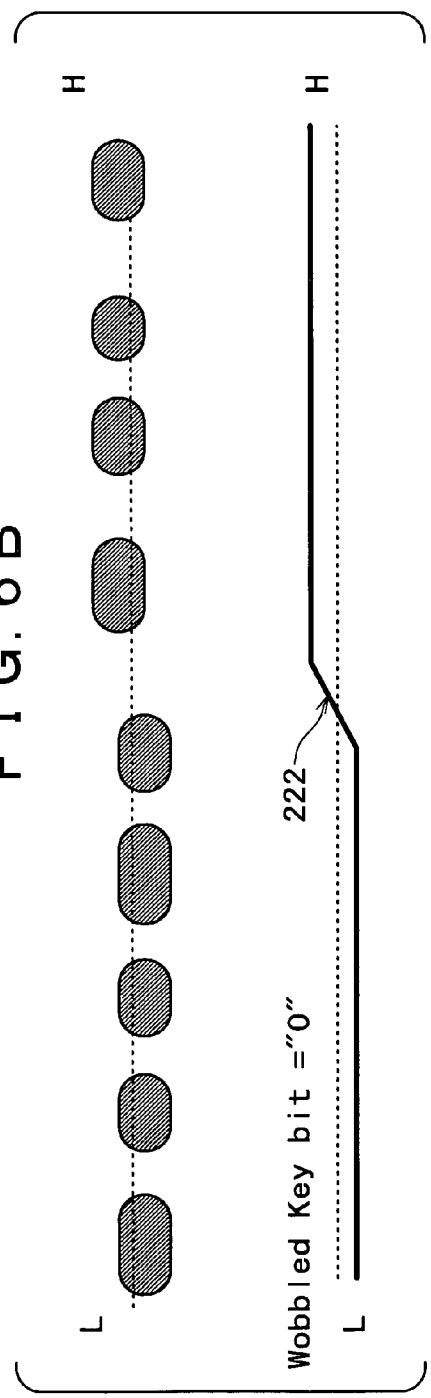

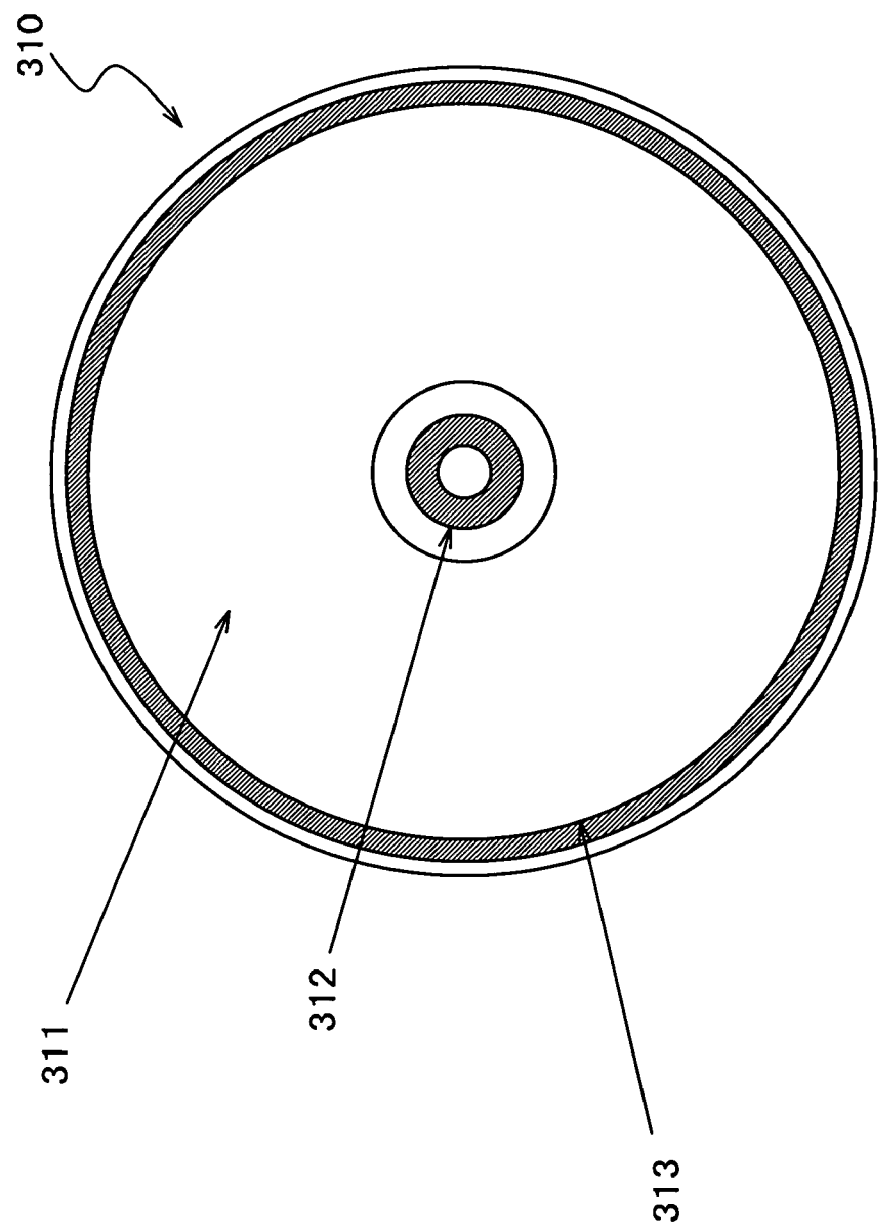

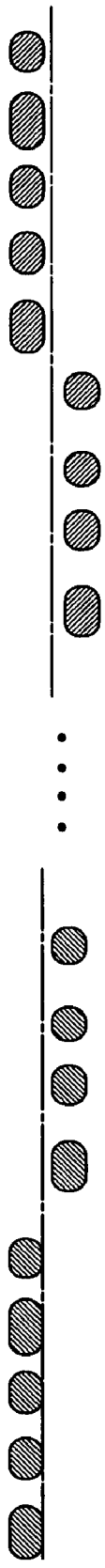
FIG.8A
FIG.8B
ADDITIONAL INFORMATION SUCH AS COPY PROTECTION INFORMATION
CRYPTOGRAPHIC KEY DATA

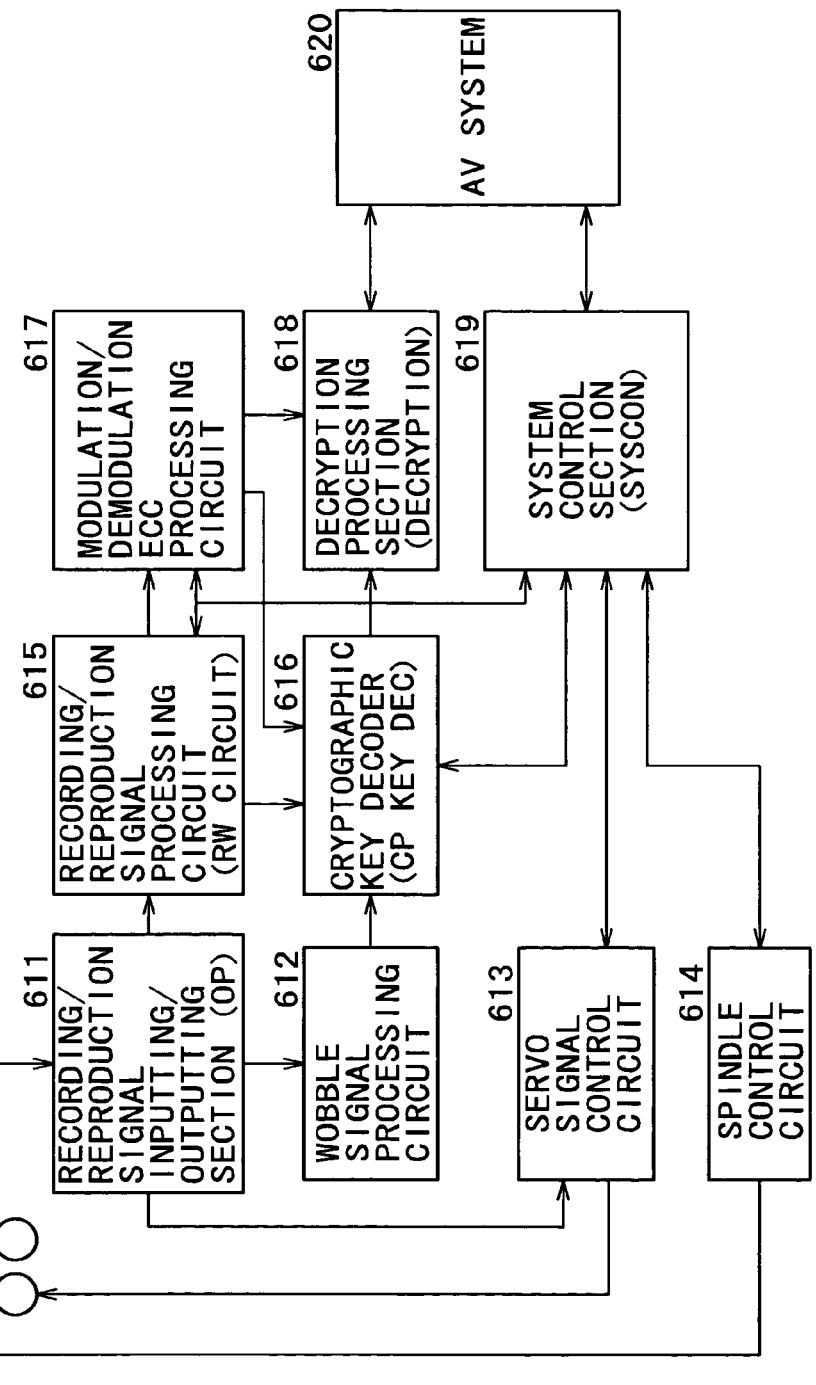

INFORMATION RECORDING PROCESSING APPARATUS, INFORMATION REPRODUCTION PROCESSING APPARATUS, INFORMATION RECORDING MEDIUM, INFORMATION RECORDING PROCESSING METHOD, INFORMATION REPRODUCTION PROCESSING METHOD, AND COMPUTER PROGRAM

CROSS REFERENCE TO RELATED APPLICATIONS

This application claims priority to Japanese Patent Application No. P2003-361504, filed on Oct. 22, 2003, the disclosure of which is incorporated by reference herein.

BACKGROUND OF THE INVENTION

The present invention relates to an information recording processing apparatus, an information reproduction processing apparatus, an information recording medium, an information recording processing method, an information reproduction processing method, and a computer program, and more particularly to an information recording processing apparatus, an information reproduction processing apparatus, an information recording medium, an information recording processing method, an information reproduction processing method, and a computer program by which a cryptographic key, such as a copy protection key, is recorded in a form in which it is difficult to analyze on an information recording medium on which contents such as, for example, image data and music data are recorded and can be reproduced efficiently from the information recording medium.

When data, such as music data or image data, is recorded as digital data on a recording medium, a recording process in accordance with a predetermined recording format is performed. For example, error detection/correction codes are added to original data of an object of recording and converted (encoded) into data of a format conforming to a particular data recording/reproduction process and then recorded.

As an information recording system which allows high density recording of information (for example, a DVD (Digital Versatile Disc) system or a Blu-Ray Disc system which uses a blue laser, whose development has been and is proceeding in recent years, to record or reproduce information) is available.

Contents to be recorded on such information recording media as mentioned above include, for example, cinema data and music data. With regard to most contents, such as music data and image data, the distribution right or the like is usually owned by a preparing person or a selling person. Accordingly, upon distribution of such contents, it is usually the case to adopt some fixed utilization control; that is, a measure for permitting only a legal user to utilize the contents but inhibiting duplication or the like which is not permitted.

A large capacity recording medium, such as a recording medium to which a blue laser recording system which allows high capacity recording is applied, allows recording of data; for example, for one or several cinemas. Contents can be recorded as digital information which does not suffer from degradation in copying and reproduction processes, this giving rise to the occurrence of many problems of a flood of illegal copies. Thus, the problem of an obstruction of benefit to the owner of the copyright or the right of distribution of contents is getting serious. From such an existing state of things as just described, it is a significant subject how to prevent illegal copying and assure protection of benefit of the owner of the copyright or the owner of the right of distribution.

In order to prevent such illegal utilization of contents, it has been proposed to record contents, which are to be recorded on an information recording medium, as encrypted contents and record additional information such as copy protection key information as cryptographic key information to be applied in utilization of such encrypted contents, information necessary for generation of a cryptographic key, or various kinds of control information such as, for example, for reproduction control or copy control of the contents as secret information on the information recording medium. A reproduction processing program to be executed on a reproduction apparatus of a user causes the reproduction apparatus to read the secret information, such as a key corresponding to contents of an object of reproduction, decode the contents in accordance with the read secret information and execute utilization of the contents in accordance with reproduction control information.

An apparatus for embedding particular information, such as a cryptographic key, is disclosed, for example, in Japanese Patent Laid-Open No. 2002-93058 (hereinafter referred to as Patent Document 1). The Patent Document 1 discloses a configuration for placing secret information into scrambled data.

While various proposals have been made for a configuration for storing additional information, such as cryptographic key information, a technique for analyzing such additional information also has progressed. Thus, the present condition is such that information regarding at what place of an information recording medium and in what manner information is recorded is acquired by a user or an illegal contents user, by whom leakage or falsification of additional information or illegal copying of contents is performed. As a result, the form of utilization of contents based on the legal right of utilization of contents is damaged, resulting in a problem that sufficient protection of the copyright or the right of utilization of contents is not achieved.

SUMMARY OF THE INVENTION

The present invention provides an information recording processing apparatus, an information reproduction processing apparatus, an information recording medium, an information recording processing method, an information reproduction processing method, and a computer program by which various kinds of additional information to be recorded on a recording medium together with contents such as, for example, a cryptographic key, cryptographic key generation information, contents reproduction control information, contents copy control information or other contents attribute information or cryptographic key data corresponding to such recording data can be recorded in a mode wherein they cannot be read by an ordinary data reading process and efficient reproduction processing can be performed upon data reproduction.

According to an embodiment of the present invention, there is provided an information recording processing apparatus for executing a data recording process, including a seed generation section for generating a seed based on an error detection code set corresponding to recording object data, a random number generation section for generating random numbers based on the seed generated by the seed generation section, a scramble processing section for executing a scrambling process, in which the random numbers generated by the random number generation section are applied, for cryptographic key data set as a cryptographic key for the recording object data, and a recording processing section for executing a recording process of a cryptographic key data recording signal generated based on the scrambled data.

According to another embodiment of the present invention, there is provided an information recording processing apparatus for executing a data recording process, including a seed generation section for generating a seed based on an error detection code set corresponding to recording object data, a random number generation section for generating random numbers based on the seed generated by the seed generation section, a bit position conversion section for executing a bit position conversion process, in which random numbers generated by the random number generation section are applied, for the cryptographic key data set as the cryptographic key for the recording object data, and a recording processing section for executing a recording process of a cryptographic key data recording signal generated based on the data obtained by the bit position conversion process.

According to another embodiment of the present invention, there is provided an information reproduction processing apparatus for executing a reproduction process of data recorded as encrypted data on an information recording medium, including a seed generation section for generating a seed based on an error detection code set corresponding to reproduction object data, a random number generation section for generating random numbers based on the seed generated by the seed generation section, a descramble processing section for executing a descrambling process, in which the random numbers generated by the random number generation section are applied, for cryptographic key data set as a cryptographic key for the reproduction object data and read from the information recording medium, and a decryption processing section for executing a decryption process of the reproduction object data with a cryptographic key generated based on the descrambled cryptographic key data.

According to another embodiment of the present invention, there is provided an information reproduction processing apparatus for executing a reproduction process of data recorded as encrypted data on an information recording medium, including a seed generation section for generating a seed based on an error detection code set corresponding to reproduction object data, a random number generation section for generating random numbers based on the seed generated by the seed generation section, a bit position conversion section for executing a bit position conversion process, in which random numbers generated by the random number generation section are applied, for the cryptographic key data set as a cryptographic key for the reproduction object data and read from the information recording medium, and a decryption processing section for executing a decryption process of the reproduction object data with a cryptographic key generated based on the data obtained by the bit position conversion process.

According to another embodiment of the present invention, there is provided an information recording medium on which encrypted data and cryptographic key data generated based on a cryptographic key applied in an encryption process of the encrypted data, the cryptographic key data being recorded as data obtained by a scrambling process in which random numbers generated using a seed generated based on an error detection code corresponding to the encrypted data as an input are applied.

According to another embodiment of the present invention, there is provided an information recording processing method for executing a data recording process, including a seed generation step of generating a seed based on an error detection code set corresponding to recording object data, a random number generation step of generating random numbers based on the seed generated by the seed generation step, a scramble processing step of executing a scrambling process, in which the random numbers generated by the random number generation step are applied, for cryptographic key data set as a cryptographic key for the recording object data, and a recording processing step of executing a recording process of a cryptographic key data recording signal generated based on the scrambled data.

According to another embodiment of the present invention, there is provided an information recording processing method for executing a data recording process, including a seed generation step of generating a seed based on an error detection code set corresponding to recording object data, a random number generation step of generating random numbers based on the seed generated by the seed generation step, a bit position conversion step of executing a bit position conversion process, in which random numbers generated by the random number generation step are applied, for the cryptographic key data set as the cryptographic key for the recording object data, and a recording processing step of executing a recording process of a cryptographic key data recording signal generated based on the data obtained by the bit position conversion process.

According to another embodiment of the present invention, there is provided an information reproduction processing method for executing a reproduction process of data recorded as encrypted data on an information recording medium, including a seed generation step of generating a seed based on an error detection code set corresponding to reproduction object data, a random number generation step of generating random numbers based on the seed generated by the seed generation step, a descramble processing step of executing a descrambling process, in which the random numbers generated by the random number generation step are applied, for cryptographic key data set as a cryptographic key for the reproduction object data and read from the information recording medium, and a decryption processing step of executing a decryption process of the reproduction object data with a cryptographic key generated based on the descrambled cryptographic key data.

According to another embodiment of the present invention, there is provided an information reproduction processing method for executing a reproduction process of data recorded as encrypted data on an information recording medium, including a seed generation step of generating a seed based on an error detection code set corresponding to reproduction object data, a random number generation step of generating random numbers based on the seed generated by the seed generation step, a bit position conversion processing step of executing a bit position conversion process, in which random numbers generated by the random number generation step are applied, for the cryptographic key data set as a cryptographic key for the reproduction object data and read from the information recording medium, and a decryption processing step of executing a decryption process of the reproduction object data with a cryptographic key generated based on the data obtained by the bit position conversion process.

According to another embodiment of the present invention, there is provided a computer program for executing a data recording process, including a seed generation step of generating a seed based on an error detection code set corresponding to recording object data, a random number generation step of generating random numbers based on the seed generated by the seed generation step, a scramble processing step of executing a scrambling process, in which the random numbers generated by the random number generation step are applied, for cryptographic key data set as a cryptographic key for the recording object data, and a recording processing step of executing a recording process of a cryptographic key data recording signal generated based on the scrambled data.

According to another embodiment of the present invention, there is provided a computer program for executing a reproduction process of data recorded as encrypted data on an information recording medium, including a seed generation step of generating a seed based on an error detection code set corresponding to reproduction object data, a random number generation step of generating random numbers based on the seed generated by the seed generation step, a descramble processing step of executing a descrambling process, in which the random numbers generated by the random number generation step are applied, for cryptographic key data set as a cryptographic key for the reproduction object data and read from the information recording medium, and a decryption processing step of executing a decryption process of the reproduction object data with a cryptographic key generated based on the descrambled cryptographic key data.

It is to be noted that each of the computer programs according to the present invention can be provided through a computer-readable storage medium such as, for example, a CD, an FD or an MO, or through a communication medium such as a network, for example, to a computer system which can execute various program codes. By providing the program in a computer-readable fashion, a process based on the program is implemented on the computer system.

With the information recording processing apparatus, information reproduction processing apparatus, information recording media, information recording processing methods, information reproduction processing methods and computer programs, where additional information such as copy protection information to be recorded on an information recording medium is encrypted and recorded and also a cryptographic key for the encrypted additional information is recorded together, as data processing for the cryptographic key data to be recorded, a seed is generated based on an error correction code corresponding to the additional information. Then, a scrambling or bit position conversion process in which random numbers generated based on the seed are applied is executed for the cryptographic key data, and resulting cryptographic key data is recorded on the information recording medium. Consequently, the cryptographic key can be recorded with increased difficulty in analysis on the information recording medium.

The additional information may be recorded as a pit signal while the cryptographic key data is recorded as a physical recording signal different from the pit signal such as, for example, a wobble signal. In this instance, reading of the additional information and reading of the cryptographic key data can be executed in parallel, and consequently, the series of processes including acquisition of a seed necessary for generation of a cryptographic key based on read data, generation of a cryptographic key based on the acquired seed and decryption of the additional information based on the generated cryptographic key can be executed at a high speed. Consequently, efficient data reproduction can be anticipated.

Additional features and advantages of the present invention are described in, and will be apparent from, the following Detailed Description of the Invention and the Figures.

BRIEF DESCRIPTION OF THE FIGURES

FIG. 2 is a diagrammatic view illustrating a configuration of sector data as recording data used in the information recording processing apparatus of FIG. 1.

FIG. 3 is a block diagram illustrating details of seed generation and a data process for a cryptographic key by the information recording processing apparatus of FIG. 1.

FIG. 4 is a block diagram illustrating details of a scrambling process in which random numbers generated based on a seed are applied and which is executed as a data process for a cryptographic key by the information recording processing apparatus of FIG. 1.

FIG. 5 is a block diagram illustrating details of a bit position conversion process in which random numbers generated based on a seed are applied and which is executed as a data process for a cryptographic key by the information recording processing apparatus of FIG. 1.

FIGS. 6A and 6B are diagrammatic views illustrating details of pit signal recording of main data and wobble signal recording of a cryptographic key by the information recording processing apparatus of FIG. 1.

FIG. 7 is a schematic view illustrating details of recorded data of an information recording medium.

FIGS. 8A and 8B are diagrammatic views illustrating details of pit signal recording of additional data and wobble signal recording of a cryptographic key of additional data by the information recording processing apparatus of FIG. 1.

FIG. 12 is a block diagram showing a configuration and a process of an information recording and reproduction processing apparatus pursuant to an embodiment of the present invention.

DETAILED DESCRIPTION OF THE INVENTION

The present invention relates to an information recording processing apparatus, an information reproduction processing apparatus, an information recording medium, an information recording processing method, an information reproduction processing method, and a computer program, and more particularly to an information recording processing apparatus, an information reproduction processing apparatus, an information recording medium, an information recording processing method, an information reproduction processing method, and a computer program by which a cryptographic key such as a copy protection key is recorded in a form in which it is difficult to analyze on an information recording medium on which contents such as, for example, image data and music data are recorded and can be reproduced efficiently from the information recording medium.

Figure 1:
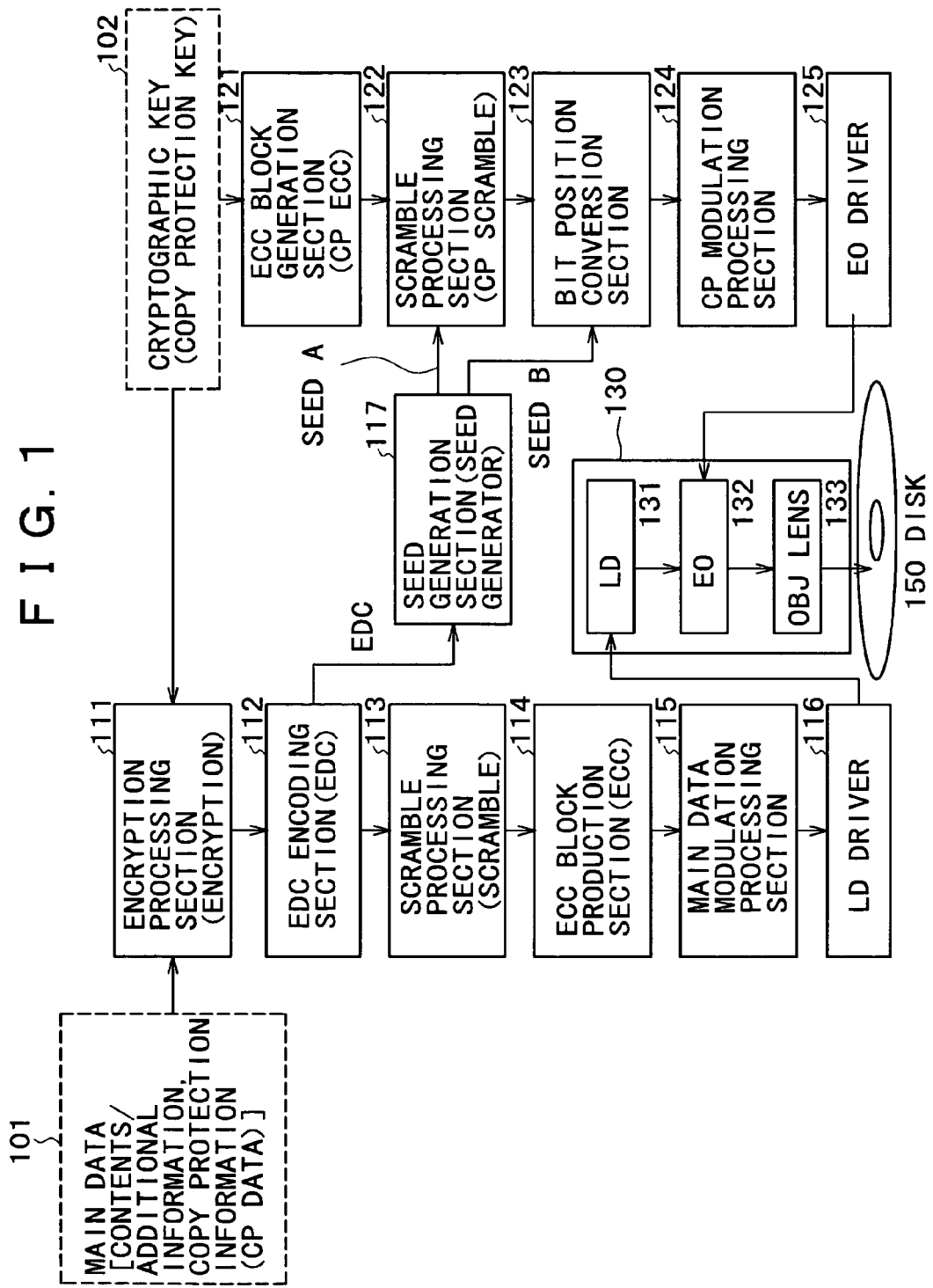
FIG. 1 is a block diagram showing a configuration of an information recording processing apparatus according to an embodiment of the present invention.

Referring first to FIG. 1, there is shown a configuration of an information recording processing apparatus according to an embodiment of the present invention. It is to be noted that the information recording processing apparatus described here includes a mastering apparatus as an apparatus for producing a disk original called master disk and is an apparatus which can be applied as a recording and reproduction apparatus for an information recording medium such as a DVD or a Blu-Ray disk which can be utilized by general users or an apparatus including an information recording medium drive such as a personal computer (PC). In other words, the information recording processing apparatus includes an information processing apparatus which executes a data recording process not only on a master disk but also on various information recording media which are recordable or rewritable information recording media.

Referring to FIG. 1, the information recording processing apparatus shown is configured so as to record main data 101 including contents information and additional information including, for example, copy protection information (CP Data) and a cryptographic key (copy protection key (CP Key)) 102 as a cryptographic processing key for the main data 101 on a disk (information recording medium) 150.

The contents information and the additional information (copy protection information) included in the main data 101 are recorded as data encrypted with the cryptographic key (copy protection key (CP Key)) 102 or as data encrypted with a cryptographic key generated based on the cryptographic key (copy protection key (CP Key)) 102 and are stored as the encrypted data on the disk 150.

The additional information included in the main data 101 includes copy protection information such as key information to be applied in a cryptographic process of contents or reproduction control information and includes data including information whose leakage is to be prevented. For example, an EKB (Enabling Key Block) as a cryptographic key block in which key information necessary for reproduction of encrypted contents is placed in an encrypted form is recorded.

The EKB is a cryptographic key data block from which a cryptographic key necessary for decryption of the contents can be acquired only by a process based, for example, on a device key stored in an information processing apparatus of a user having a valid license. The EKB is set as a cryptographic key block which permits acquisition of a key only by a user device (information processing apparatus) which has a valid contents utilization license but can inhibit acquisition of the cryptographic key by an invalidated (revoked) user device in accordance with an information distribution system according to a hierarchical tree structure.

It is to be noted that the EKB is an example of data which forms additional information, and the additional information in the present invention is not limited to the EKB but may be any information which is recorded as secret information on a disk such as other cryptographic key information, cryptographic key generation information, contents reproduction control information or license information. There is no limitation to data which composes the additional data.

In FIG. 1, processing blocks 111 to 116 belong to a main data processing system for executing processing for main data while processing blocks 121 to 125 belong to a cryptographic key processing system for executing processing of a cryptographic key. First, processing of the main data is described.

The main data 101, that is, contents information and additional information, are first encrypted with a cryptographic key (copy protection key) 102 by an encryption processing section 111. The encoded main data is divided into units (sectors) of approximately 2 k bytes by an EDC encoding section 112. Further, an error detection code (EDC) for checking whether or not the information of approximately 2 k bytes includes some error is added to each sector by the EDC encoding section 112.

FIG. 2 illustrates a sector data configuration wherein an EDC is added. One sector includes a data part 161 of 2,048 bytes and an EDC (Error Detection Code) part 162 of 4 bytes.

The data with an EDC added by the EDC encoding section 112 shown in FIG. 1 is subject to a scrambling process for randomizing the signal pattern after modulation executed by a scramble processing section 113. An ECC block production section 114 encodes error correction information (ECC) for the scrambled data and adds the encoded error correction information and address information to the scrambled data to produce an ECC block.

To the ECC block data having the error correction information and the address information added thereto, synchronism information is added by a main data modulation processing section 115, and a modulation process for producing a recording or reproduction band signal conforming to a recording or reproduction channel of a disk is performed for the ECC block data by the main data modulation processing section 115. Further, the output signal of the main data modulation processing section 115 is converted into an NRZI (Non Return to Zero Inverted) signal wherein the polarity of a pulse is inverted in accordance with the value of "0" or "1" of modulation data, and the NRZI signal is outputted as a recording signal to an LD (laser diode) driver 116.

The (LD laser diode) driver 116 modulates a laser diode (LD) 131 of an optical pickup (OP) 130 based on the NRZI signal. The modulated laser light is condensed on the disk 150 by an objective lens (obj lens) 133 to record the encrypted data of the main data 101 including the contents information and the additional information on the disk 150.

Now, a recording process of a cryptographic key (copy protection key) 102 applied to encrypt the main data 101 including contents information and additional information (copy protection information) is described.

An ECC block generation section (CP ECC) 121 encodes error correction information (ECC) for cryptographic key data of a cryptographic key (copy protection key) 102 to produce an ECC block wherein an ECC is set to the cryptographic key data. Then, a scramble processing section (CP Scramble) 122 executes a scrambling process.

In particular, the scramble processing section (CP scramble) 122 applies a seed inputted thereto from a seed generation section (seed generator) 117 to generate random numbers and applies the generated random numbers to execute a scrambling process for the cryptographic key data inputted thereto from the ECC block generation section 121.

The scrambled cryptographic key data are inputted to a bit position conversion section 123, which executes a bit position conversion process in which random numbers generated based on the seed inputted from the seed generation section 117 are applied.

Details of the processes by the seed generation section 117, scramble processing section 122 and bit position conversion section 123 are described with reference to FIG. 3, and so forth.

FIG. 3 shows the EDC encoding section 112 which belongs to the main data processing system shown in FIG. 1, and the ECC block generation section 121, scramble processing section 122 and bit position conversion section 123 which belong to the processing system for the cryptographic key 102, and the seed generation section 117.

The seed generation section 117 receives EDC bit information set as an error detection code corresponding to main data by the EDC encoding section 112 which belongs to the processing system for main data. Then, the seed generation section 117 executes an arithmetic operation process based on the received EDC bit information to produce seed information to be outputted to the ECC block generation section 121 and scramble processing section 122 which belong to the processing system for the cryptographic key 102.

The EDC encoding section 112, which belongs to the processing system for main data, produces, for each of the contents and additional information, sector data composed of a data part of 2,048 bytes and an EDC (Error Detection Code) part of 4 bytes as described hereinabove with reference to FIG. 2.

The seed generation section 117 receives the EDC as an error detection code set by the EDC encoding section 112 and executes an arithmetic operation process based on the composition bit information of the EDC to generate a seed.

As seen in FIG. 3, an arithmetic operation section 1171 provided in the seed generation section 117 executes an arithmetic operation process based on an input of the EDC and generates and outputs seed information of a predetermined bit number. As a function for use in the execution of the arithmetic operation, for example, an arithmetic operation process on the extension field GF ($2^8$) or the like is applied.

For example, the arithmetic operation section 1171 of the seed generation section 117 executes an arithmetic operation process based on an input of the EDC as an error correction code to generate seed information of n+m bits and outputs part (n bits) of the seed information as a seed A to the scramble processing section 122 which belongs to the cryptographic key processing system. Further, the arithmetic operation section 1171 outputs the remaining m bits as a seed B to the bit position conversion section 123.

Now, a scrambling process in which seed information is applied and which is executed by the scramble processing section 122 which belongs to the processing system for the cryptographic key 102 is described with reference to FIG. 4.

The scramble processing section 122 receives cryptographic data set as an ECC block from the ECC block generation section 121 of the processing system for the cryptographic key 102 and receives seed information (a seed A) generated based on error detection information (EDC) of main data by the seed generation section 117 as described hereinabove with reference to FIG. 3.

As seen in FIG. 4, the scramble processing section 122 inputs the seed A to a random number generator (Random Generator) 171 provided in the scramble processing section 122 so that random numbers based on the seed A are generated by the random number generator 171. For example, the value of the seed A is set as an initial value to the random number generator 171, and a random number is generated for each system clock by the random number generator 171. The random number generator 171 may be of the type which is formed, for example, from a linear feedback shift register (LFSR) or from a pseudo-random number generator.

The random numbers generated based on the seed A by the random number generator 171 are used in an exclusive OR arithmetic operation executed by an exclusive OR section 172 with cryptographic key data (copy protection data) inputted from the ECC block generation section 121 to produce scramble data. The produced scramble data is inputted to the bit position conversion section 123 at the next processing stage in the cryptographic key processing system.

The bit position conversion section 123 executes a bit position conversion process in which seed information (a seed B) for the scramble data of the cryptographic key data inputted from the scramble processing section 122 is applied.

The bit position conversion process in which the seed information (seed B) is applied and which is executed by the bit position conversion section 123 is described with reference to FIG. 5.

The bit position conversion section 123 inputs the seed B to a random number generator 181 therein so that random numbers based on the seed B are generated by the random number generator 181. For example, the value of the seed B is set as an initial value to the random number generator 181, and a random number is generated for each system clock by the random number generator 181. Similarly to the scramble processing section 122, the random number generator 181 may be of the type which is formed, for example, from a linear feedback register (LFSR) or from a pseudo-random number generator.

On the other hand, component bits of the cryptographic key data (copy protection key data) inputted from the scramble processing section 122 are successively stored into a data storage region of a RAM 182. The random numbers generated based on the seed B by the random number generator 181 are inputted as a read address data for the RAM 182 to the RAM 182.

Component bits of the scrambled cryptographic key data (copy protection key data) stored in the RAM 182 are read out and outputted serially in accordance with the address generated based on the random numbers.

For example, where the scrambled data of the cryptographic key data (copy protection key data) inputted from the scramble processing section 122 is 128-bit data, the 128-bit scrambled data inputted from the scramble processing section 122 are successively stored into memory positions of the RAM 182 such that the first bit is stored into the memory position of the address "001" of the RAM 182, the second bit into the memory position of the address "002," the third bit into the memory position of the address "003," and so forth until the 128th bit is stored.

Meanwhile, the random number generator 181 outputs address data 1 to 128 at random to the RAM 182 based on the seed B generated based on the error detection information (EDC) for the main data. For example, the random number generator 181 outputs such addresses as [125], [003], [084], . . . to the RAM 182.

The RAM 182 applies each address inputted from the random number generator 181 as a data readout address and first reads out bit information stored at the position of the memory position [125], and reads out bit information stored at the position of the memory position [003], and then reads out bit information stored at the position of the next memory position [084]. Through such processes, replacement of the positions of the component bits of the scrambled cryptographic key data stored in the RAM 182 is executed, and resulting bit position conversion data is outputted.

The bit position conversion data outputted from the bit position conversion section 123 is inputted to a CP modulation processing section 124 which is a next processing section which belongs to the cryptographic key processing system.

Description of the recording process of the cryptographic key 102 is described with reference back to FIG. 1. The CP modulation processing section 124 executes a modulation process for the cryptographic key data outputted from the bit position conversion section 123 and executes a modulation process of converting the cryptographic key data into a physical recording signal different from a pit signal, for example, into a recording and reproduction band signal conforming with, for example, a wobble recording or reproduction channel of the disk. The wobble signal is hereinafter described in detail.

The data modulated by the CP modulation processing section 124 is NRZI converted and then outputted to an EO (Electro-Optic: electro-optic element) driver 125. Thus, the laser light from the laser diode 131 is polarized by a modulation process of the electro-optic element 132 of the optical pickup 130 based on the NRZI data to record a physical recording signal different from a pit signal, such as a wobble signal, based on the cryptographic key 102 data on the disk 150.

A recording process of the wobble signal is described with reference to FIGS. 6A and 6B. Main data composed of contents information and additional information including copy protection information is recorded as the lengths of a space and a mark depending upon a pit 201.

On the other hand, the cryptographic key 102 data of a copy protection key or the like is recorded by controlling the wobble recording; that is, the deflection of a bit stream on which main data is recorded.

In a wobble recording signal 221 illustrated in FIG. 6A, a pit train for recording of main data exhibits a deflection (H→L) at which it shifts from an upper stage to a lower stage shown in FIG. 6A. This wobble recording signal 221 corresponds to a recoding bit "1" of the cryptographic key data.

In a wobble recording signal 222 illustrated in FIG. 6B, a pit train for recording of main data exhibits a deflection (L→H) at which it shifts from a lower stage to an upper stage shown in FIG. 6B. This wobble recording signal 222 corresponds to a recoding bit "0" of the cryptographic key data.

It is to be noted that one bit in a wobble recording signal corresponds to a state of a deflection of recording pits within the length of 68 T (T is the one channel length of the pit signal) of main data recorded as the pit signal, and one component bit of the cryptographic key data is read for every 68 T of the main data recorded as pit information.

By recording main data, which includes contents information and additional information including copy protection information, as pit information and recording a cryptographic key as a wobble recording signal in this manner, the main data and the cryptographic key can be recorded in an overlapping relationship on the disk. Further, upon data reading, the variety of different kinds of information (main data and cryptographic key) can be read in parallel.

It is to be noted that, while a mode wherein a cryptographic key is recorded as a wobble recording signal is described as an example, the cryptographic key need not be recorded as a wobble recording signal but can be recorded by various recording modes if it is recorded as a physical recording signal different from a pit signal. For example, a recording method which is based on the variation in pit width, in pit shape, in depth of the groove or the like which can be recorded only on a ROM disk may be applied.

A configuration of a disk produced by the recording process described above is described with reference to FIG. 7. It is to be noted that, as described hereinabove, the information recording processing apparatus shown in FIG. 1 is an apparatus which can be applied as an apparatus which includes a mastering apparatus as a production apparatus for a disk original called master disk and further includes a recording and/or reproduction apparatus for an information recording medium such as a DVD or a Blu-Ray disk which can be utilized by general users or an information recording medium drive of a PC or the like. In other words, the information recording processing apparatus also includes an information processing apparatus which executes a data recording process not only for a master disk but also for various recordable or rewritable information recording media, and FIG. 7 shows a master disk produced by a recording process of main data and cryptographic key data described above or an information recording medium such as a DVD or a Blu-Ray disk which is produced by a stamping process based on a master disk and which can be utilized by general users.

The information recording medium 310 includes a data region 311 in which contents are stored, a lead-in region 312 in which additional information such as copy protection information or contents reproduction control information is recorded, and a lead-out region 313 set to an outer circumferential portion around the data region 311 of the disk.

The information in the lead-in region 312 cannot be read in an ordinary data reproduction process but can be read only at a specific processing step such as a contents cryptographic key acquisition step or a reproduction control information acquisition step executed during execution of a specific contents reproduction program.

The lead-in region 312 records additional information such as a contents key as a cryptographic key for contents or data necessary for generation of the contents key, copy protection information such as reproduction control information, and so forth. The additional information is recorded as data encrypted with the cryptographic key 102 (refer to FIG. 1) described hereinabove. The recorded data is recorded as pit data while the cryptographic key is recorded as a wobble recording signal set corresponding to the recording pits of the additional data. In other words, the additional data and the cryptographic key for the additional data are recorded in an overlapping relationship on the disk.

FIGS. 8A and 8B illustrate an example of the recording signal in the lead-in region. In particular, FIG. 8A illustrates additional information recorded as pit information and including copy protection information such as reproduction control information and so forth. FIG. 8B illustrates cryptographic key information formed from a wobble recording signal recorded as deflections or shifts of the recording pits of FIG. 8A.

The additional information formed from pit information is data encrypted with the cryptographic key which can be acquired from the wobble recording signal.

An information reproduction processing apparatus can read in parallel the additional information formed from pit information and cryptographic key data formed from a physical recording signal different from the pit signal, for example, a wobble recording signal, both recorded in an overlapping relationship in the lead-in region. The information reproduction processing apparatus acquires the cryptographic key based on the read wobble recording signal and performs decryption of the encrypted additional data acquired by the reading of the pit information to acquire the additional data.

It is to be noted that, while additional data and cryptographic key data here are recorded in the lead-in region, they may otherwise be recorded in the data region.

Figure 9:
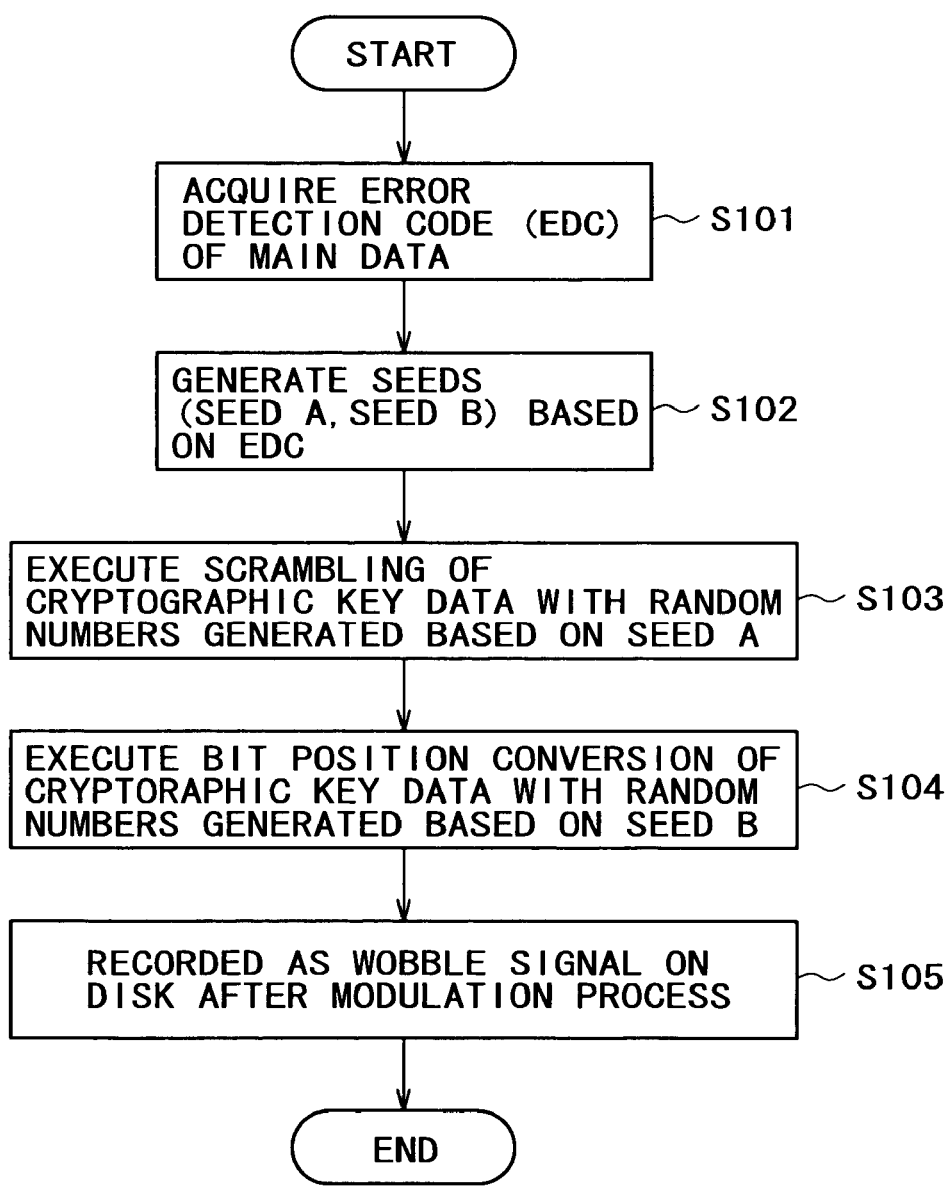
FIG. 9 is a flow chart illustrating a data processing sequence for a cryptographic key by the information recording processing apparatus of FIG. 1.

Now, a data processing sequence of a cryptographic key based on a seed acquired applying an EDC of main data, which is executed by the information recording processing apparatus of the present invention, is described with reference to FIG. 9.

At step S101, an error detection code (EDC) of main data is acquired. The main data is contents or additional data and is data recorded as pit information on the disk.

At step S102, seeds (seed A and seed B) are generated based on the acquired error detection code (EDC) of the main data. This process is executed by the seed generation section 117 executing arithmetic operation based on the EDC to generate the seeds as described hereinabove with reference to FIG. 3.

Then, at step S103, random numbers are generated based on the seed A, and scrambling of cryptographic key data is executed with the generated random numbers. This process is executed by the scramble processing section 122 as described hereinabove with reference to FIG. 4.

Then, at step S104, random numbers are generated based on the seed B, and bit position conversion of the cryptographic key data is executed with the generated random numbers. This process is executed by the bit position conversion section 123 as described hereinabove with reference to FIG. 5.

Then, at step S105, a modulation process is performed for the cryptographic key data for which the scrambling process and the bit position conversion process have been performed, and the modulated cryptographic key data is recorded as a wobble signal on the disk.

Now, a process and a configuration of an information reproduction processing apparatus which reproduces the information recording medium (refer to FIG. 7) on which the recording data described above is recorded are described with reference to FIG. 10.

Figure 10:
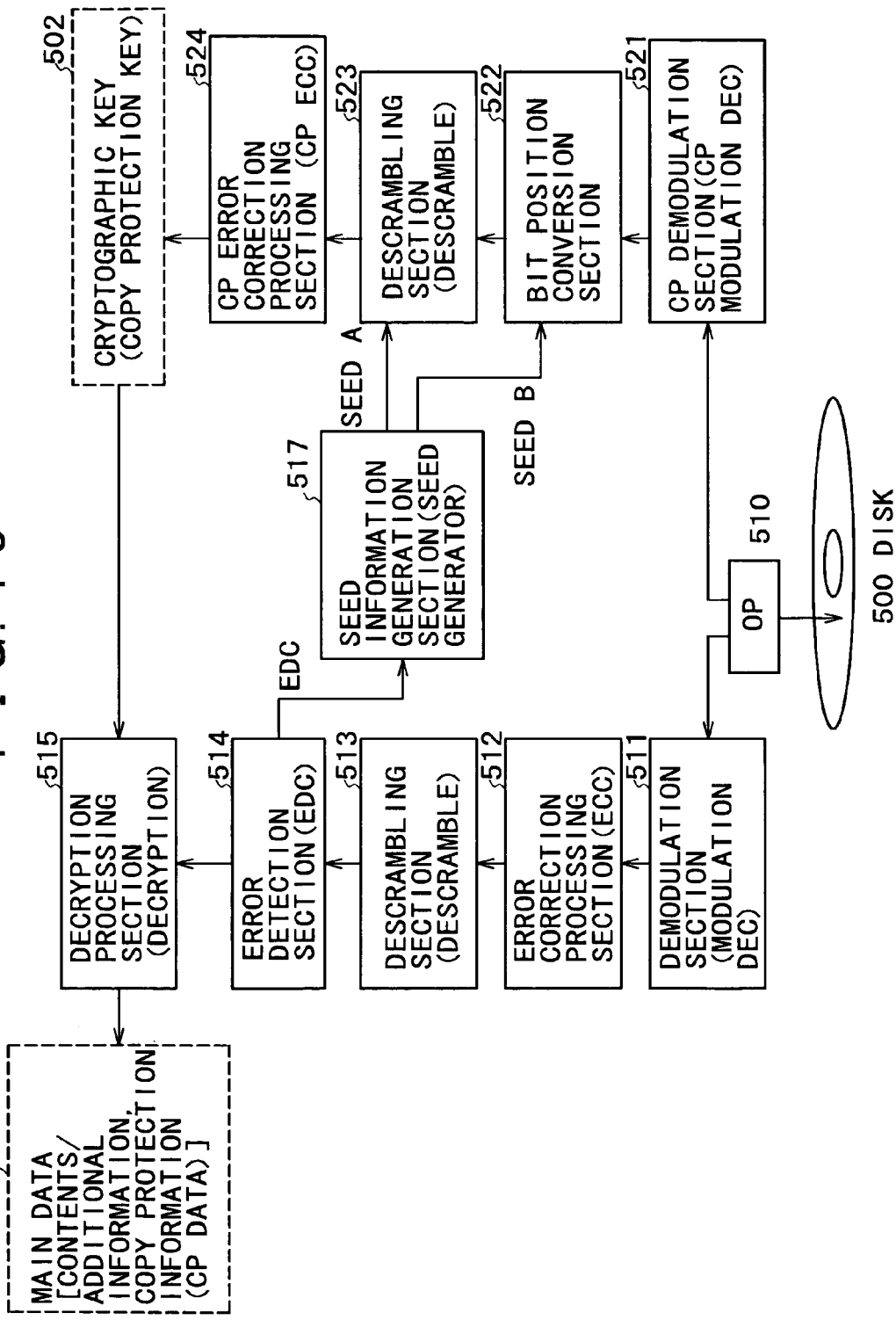
FIG. 10 is a block diagram showing a configuration of an information reproduction processing apparatus pursuant to an embodiment of the present invention.

The information reproduction processing apparatus shown in FIG. 10 executes a process of reading contents from a disk 500 and reading additional information formed from copy protection information, and so forth. Such contents and additional information are recorded in the form of a pit signal as main data 501 and recorded as encrypted data with a cryptographic key (copy protection key) 502. Accordingly, upon a reproduction process of the main data, a decryption process in which the cryptographic key (copy protection key) 502 is applied is required.

First, a reproduction sequence of the main data 501 formed from contents information and additional information formed from copy protection information, and so forth, recorded on the disk 500 is described.

The main data is recorded as a pit signal on the disk 500 and read from the disk 500 by an optical pickup 510. The read signal is subject to a decryption process executed by a demodulation section (modulation DEC) 511.

Then, an error correction processing section (ECC) 512 executes an error correction process based on an ECC and acquisition of address information. Then, a descrambling section (Descramble) 513 performs a process for canceling the scramble, that is, a descrambling process, for the information scrambled so as to make modulation signals appear at random upon data recording thereby to descramble the scrambled information.

Further, an error detection section (EDC) 514 verifies presence/absence of a data error using an error detection code (EDC) set in a unit of a sector of 2 kB of the descrambled information. Thereafter, a decryption processing section (Decryption) 515 performs a decryption process in which the cryptographic key (copy protection key) 502 generated based on the data (wobble signal) read from the disk 500 is used to produce main data 501, and the so produced main data 501 is outputted.

Now, a process of reading a cryptographic key (copy protection key) 502 from the disk 500 and generating the cryptographic key (copy protection key) 502 is described. A cryptographic key (copy protection key) is read from the disk 500, on which it is recorded as a physical recording signal different from a pit signal such as, for example, a wobble signal, as a push-pull signal by the optical pickup 510.

The read wobble signal is subject to a demodulation process executed by a CP demodulation section (CP modulation DEC) 521. The demodulated signal is subject to a bit position conversion process executed by a bit position conversion section 522.

The bit position conversion section 522 receives a seed generated based on an error detection code (EDC) from a seed information generation section 517, generates random numbers based on the seed and executes bit position conversion based on the generated random numbers.

The seed information generation section 517 has a configuration similar to that of the seed generation section 117 in the information recording processing apparatus described hereinabove with reference to FIG. 1. The seed information generation section 517 receives an error detection code (EDC) for main data and executes an arithmetic operation process to generate a seed (seed B) to be outputted to the bit position conversion section 522 and another seed (seed A) to be outputted to a descrambling section 523.

The bit position conversion section 522 receives the seed B from the seed information generation section 517 and applies random numbers generated based on the seed B to execute an algorithm opposite to that of the bit position conversion process executed in the recording process described hereinabove with reference to FIG. 5 to generate data having bit positions the same as those prior to the bit position conversion process.

The data generated by the process of the bit position conversion section 522 and having the original bit positions is inputted to the descrambling section 523, by which a descrambling process is performed for the data.

The descrambling section 523 receives the seed A from the seed information generation section 517 and applies random numbers generated based on the seed A to execute an algorithm reverse to that of the scrambling process in the recording process described hereinabove with reference to FIG. 4 to perform descrambling to generate data the same as the data prior to the scrambling process.

The data descrambled by the descrambling section 523 is inputted to a CP error correction processing section (CP ECC) 524, by which an error correction process based on an ECC is performed to acquire a cryptographic key (copy protection key) 502.

The decryption processing section 515 applies the cryptographic key (copy protection key) 502 acquired by this process to execute a decryption process of the main data including additional data, and resulting main data 501 is outputted.

For example, a cryptographic key of additional data including copy protection information is recorded as a wobble signal corresponding to pits of the additional data including the copy protection information, and reading of the pit signal and reading of the wobble signal can be executed in parallel. Thus, the process for the main data executed at blocks 511 to 515 illustrated in FIG. 10 and the process for the cryptographic key executed at blocks 521 to 524 can be executed in parallel, and consequently, efficient reading, decoding and reproduction of data can be achieved.

Figure 11:
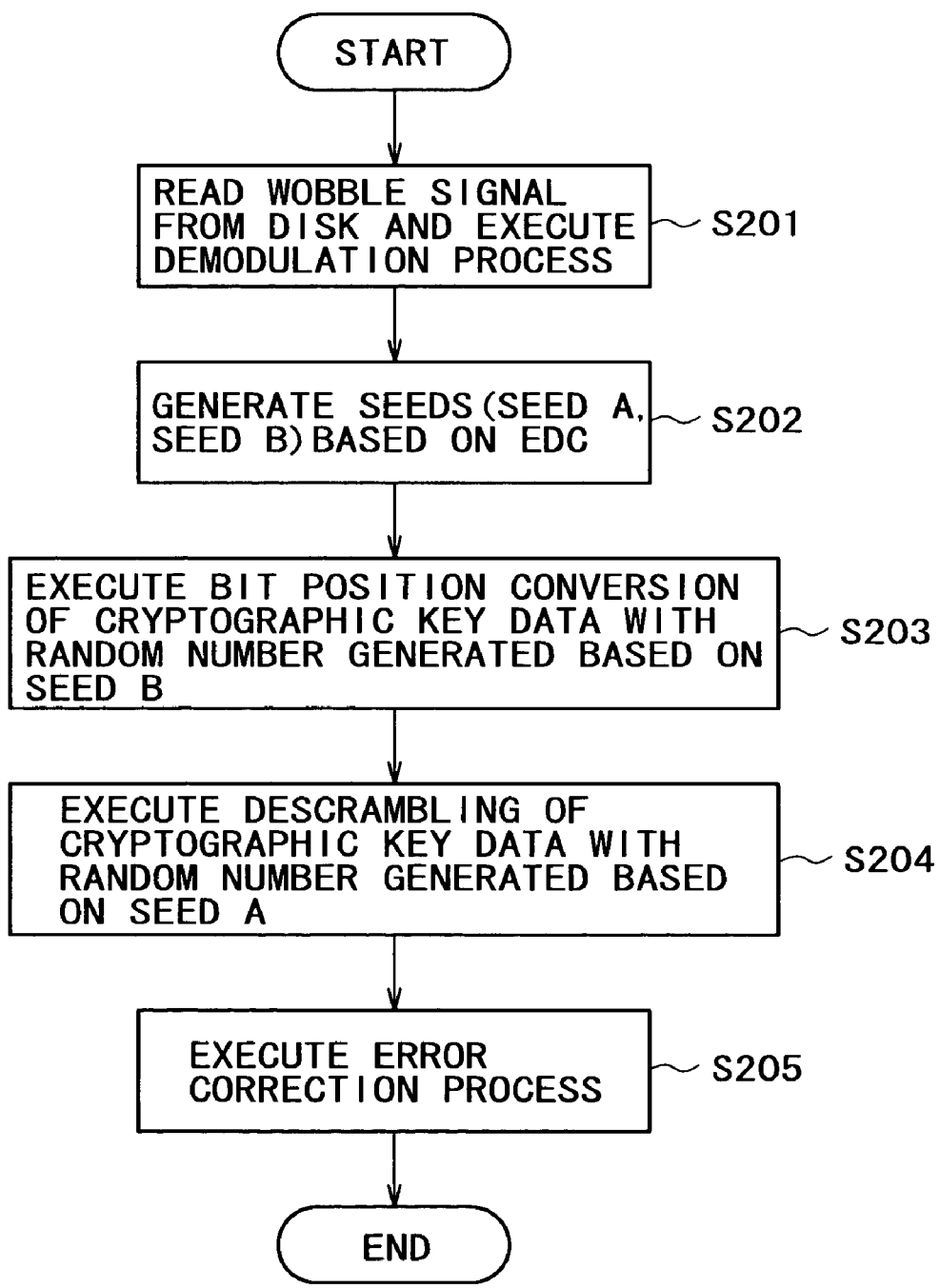
FIG. 11 is a flow chart illustrating a data processing sequence for a cryptographic key by the information reproduction processing apparatus of FIG. 1.

Now, a processing sequence of reading a cryptographic key from a disk and generating the cryptographic key is described with reference to FIG. 11. At step S201, a wobble signal is read from a disk and a demodulation process is executed for the wobble signal. At step S202, an error detection code (EDC) for main data is acquired, and seeds (seed A and seed B) are generated based on the acquired error detection code (EDC) for main data. This process is a process similar to that described hereinabove with reference to FIG. 3 and is a process executed by the seed information generation section 517 executing arithmetic operation based on the EDC to generate seeds.

Then, at step S203, random numbers are generated based on the seed B, and bit position conversion of the cryptographic key data is executed with the generated random numbers. This process is a process, wherein an algorithm opposite to that of the bit position conversion process executed in the data recording process described hereinabove with reference to FIG. 5, to generate data having bit positions the same as those prior to the bit position conversion process.

Then, at step S204, random numbers are generated based on the seed A, and descrambling of the cryptographic key data is performed with the generated random numbers. This process is a process, wherein an algorithm opposite to that of the scrambling process executed in the data recording process described hereinabove with reference to FIG. 4, to generate data the same as those prior to the scrambling process.

Then, at step S205, an error correction process is performed based on an ECC and a cryptographic key (copy protection key) is acquired. The cryptographic key (copy protection key) is used to execute a decryption process of the main data including additional data.

Now, a configuration of an information recording and reproduction processing apparatus including, for example, a DVD drive or a Blu-Ray drive as a reproduction processing device for an information recording medium is described with reference to FIG. 12.

A disk 600 is a DVD or a Blu-Ray disk on which encrypted main data is recorded as a pit signal and cryptographic data is recorded as a wobble signal as described hereinabove.

A recording/reproduction signal inputting/outputting section (OP) 611 includes an optical system including a laser diode, a reproduction amplifier, a two-axis actuator and so forth and executes reading of a signal on the disk 600. It is to be noted that the apparatus shown in FIG. 12 has an apparatus configuration which also can perform a recording process.

A wobble (Wobble) signal processing circuit 612 acquires the wobble signal from the disk 600 and executes a demodulation process for a read signal.

A cryptographic key decoder (CP key DEC) 616 receives a timing signal from a recording/reproduction signal processing section (RW circuit) 615 and error detection code (EDC) data for main data inputted from a modulation/demodulation ECC processing circuit 617, and generates seeds (seed A and seed B) based on the error detection code (EDC) data. Then, the cryptographic key decoder 616 generates random numbers based on the so-generated seeds, executes bit position conversion and descrambling applying the generated random numbers, and executes error correction based on the ECC to generate a cryptographic key (copy protection key).

The recording/reproduction signal processing section 615 performs, upon recording of data on the disk 600, recording compensation, but performs, upon reproduction of data from the disk 600, binary data reproduction via a PLL or the like. The modulation/demodulation ECC processing circuit 617 executes a modulation or demodulation process of recording or reproduction data, executes error correction encoding or decoding and error correction processes, and further executes reproduction of address information. It is to be noted that the modulation/demodulation ECC processing circuit 617 extracts an error detection code (EDC) set to each sector data of the main data and outputs the extracted error detection code to the cryptographic key decoder 616.

A decryption processing section 618 applies a cryptographic key (copy protection key) generated based on a wobble signal read from the disk 600 by the cryptographic key decoder 616 to execute a decryption process for encoded main data and encoded copy protection information, for example, as encoded additional data and a decoding process for encoded contents. Then, the decryption processing section 618 outputs a result of the decoding to an AV system 620 which executes a contents reproduction process.

A servo signal control circuit 613 performs servo control of the two-axis actuator and seek control of the optical pickup head. A spindle control circuit 614 performs control of a spindle motor which rotates the disk 600. A system control section (Syscon) 619 communicates with the AV system 620 and controls the processing blocks.

A process executed to acquire a cryptographic key (copy protection key) recorded as a wobble signal on the disk 600 and reproduce main data and, for example, copy protection information as additional information is described.

First, an additional information reproduction command is sent from the AV system 620 to the system control section 619. The system control section 619 acquires address information from the modulation/demodulation ECC processing circuit 617 and controls the servo signal control circuit 613 to perform a seeking operation of the pickup to move so that the optical pickup head can read data at a desired address position.

A read signal of the optical pickup head from the thus set position is outputted to the wobble signal processing circuit 612. The wobble signal processing circuit 612 demodulates the read wobble signal, and the demodulation signal is inputted to the cryptographic key decoder 616.

The cryptographic key decoder 616 receives a timing signal from the recording/reproduction signal processing section 615 and further receives an error detection code (EDC) set to the additional information recorded as a pit signal from the modulation/demodulation ECC processing circuit 617. Further, the cryptographic key decoder 616 performs bit information position re-arrangement with random numbers generated using a seed generated applying the EDC data, descrambling and error correction to obtain a cryptographic key (copy protection key).

On the other hand, the additional information such as copy protection information recorded in an overlapping relationship with the cryptographic key (copy protection key) data is reproduced simultaneously by a data process or the like to which a PLL circuit is applied in the recording/reproduction signal processing section 615. The reproduced data is demodulated by the modulation/demodulation ECC processing circuit 617, and the so-demodulated bit stream is error correction decoded based on the ECC.

Further, a decryption process of encrypted additional data to which the cryptographic key generated based on the wobble signal by the cryptographic key decoder 616 is applied is executed by the decryption processing section 618, and a result of the decryption is outputted to the AV system 620.

Since, at the pit signal positions (for example, the lead-in region) at which the additional information as the main data is recorded, cryptographic key data of the additional information is recorded as a wobble signal, reading of the encoded additional data and reading of the cryptographic key from the disk can be executed in parallel without accessing them separately. Since parallel processing is executed for such processes as demodulation of read data and error correction, the processing time up to the decryption process of encoded main data with a generated cryptographic key is reduced and efficient reading and reproduction of data can be anticipated.

Subsequently, a reproduction process of encoded contents recorded on the disk 600 is described.

First, a contents reproduction command is sent from the AV system 620 to the system control section 619. The system control section 619 acquires address information from the modulation/demodulation ECC processing circuit 617 and controls the servo signal control circuit 613 to execute a seeking operation in accordance with the acquired address information to move the optical pickup to the desired address position.

Then, a reproduction signal is acquired from the optical pickup, and the recording/reproduction signal processing section 615 uses a PLL or the like to obtain reproduction data. The reproduction data is subject to a demodulation process and an error correction process executed by the modulation/demodulation ECC processing circuit 617.

Then, the decryption processing section 618 executes a decryption process for the encoded contents read from the disk 600. The cryptographic key generated based on the wobble signal by the cryptographic key decoder 616 is applied to the decryption process.

Contents in the form of, for example, an image/sound reproduction bit stream obtained as a result of the decryption process by the decryption processing section 618 are outputted to the AV system 620.

It is to be noted that the additional information recorded on the information recording medium is data encoded with the cryptographic key recorded as a wobble signal, and the contents are recorded as encrypted data. The contents are encrypted with a cryptographic key recorded as a wobble signal or a contents key generated based on the cryptographic key.

Accordingly, where the contents are encrypted with the contents key, a contents key generation process to which the cryptographic key recorded as the wobble signal is applied is executed, and the a decryption process for the encrypted contents is executed with the contents key.

The additional information sometimes includes information necessary for acquisition of a contents key described above such as, for example, an EKB described hereinabove. The additional information includes key data to be applied in a decryption process for encrypted contents, key generation information, contents reproduction control information, contents copy control information and attribute information of contents.

The additional information is recorded as encoded data and, for example, as a pit signal in the lead-in region of the disk as described hereinabove, and the cryptographic key data as a key applied in the encryption of the additional information is recorded as a wobble signal at a position corresponding to the pit information.

Accordingly, upon reproduction of the additional information, reading of the encoded additional information and reading of the cryptographic key applied in the encryption of the additional information can be executed in parallel. Consequently, such processes as demodulation of the read data and error correction can be executed in parallel, and generation of a cryptographic key, decryption of the additional information with the generated cryptographic key and reproduction can be performed efficiently.

It is to be noted that, while the series of processes described above can be executed by hardware, it otherwise may be executed by software or by a composite configuration of hardware and software. Where the series of processes is executed by software, a program which defines a processing sequence is installed into a memory in a computer incorporated in hardware for exclusive use or into a computer for universal use which can execute various functions by installing various programs.

For example, the program can be recorded in advance on a hard disk or a ROM (Read Only Memory) as a recording medium. Or, the program may be stored (recorded) temporarily or permanently on a removable recording medium such as a flexible disk, a CD-ROM (Compact Disc Read Only Memory), an MO (Magneto-Optical) disk, a DVD (Digital Versatile Disc), a magnetic disk or a semiconductor memory. Such a removable recording medium as just mentioned can be provided as package software.

It is to be noted that the program may not be installed from such a removable recording medium as described above into a computer, but otherwise may be transferred from a download site to a computer by wireless communication or through a network such as a LAN (Local Area Network) or the Internet to a computer by wire communication. The computer may receive the program transferred in this manner and install the program into a built-in recording medium thereof such as a hard disk.

It is to be noted that the steps described in the present specification may be but need not necessarily be, processed in a time series in the order as described or may be executed parallelly or individually based on the processing capacity of the apparatus which executes the processing or as occasion demands. Further, in the present specification, the term "system" or the like is used to represent a logical collective configuration composed of a number of apparatuses which may be or may not be included in the same housing.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the herein appended claims.

The invention claimed is:

1. An information recording processing apparatus for executing a data recording process, the information recording processing apparatus comprising:

a seed generation section configured to:
   (a) receive an error detection code corresponding to recording object data, the received error detection code representing any error added to the recording object data; and
   (b) generate a seed based on said received error detection code;

a random number generation section configured to generate a plurality of random numbers based on the generated seed, wherein at least one of the random numbers is generated using the generated seed as an initial value thereof;

a scramble processing section configured to:
   (a) receive cryptographic key data corresponding to a cryptographic key for the recording object data; and
   (b) execute a scrambling process for the cryptographic key data, wherein a first plurality of the random numbers generated by the random number generation section are applied to the cryptographic key data to obtain scrambled data; and a recording processing section configured to execute a recording process of a cryptographic key data recording signal, wherein the cryptographic key data recording signal is generated based on the scrambled data obtained by the scrambling process.

2. The information recording processing apparatus according to claim 1, further comprising:
   a bit position conversion section configured to execute a bit position conversion process to obtain bit position conversion data from the scrambled data obtained by the scrambling process, wherein a second plurality of the random numbers generated by the random number generation section are applied to the scrambled to obtain the bit position conversion data,
   wherein the cryptographic key data recording signal is generated based on the bit position conversion data obtained by the bit position conversion process.

3. The information recording processing apparatus according to claim 2, wherein the seed generation section is configured to generate a plurality of seeds, each of the plurality of seeds being generated based on the received error detection code corresponding to the recording object data, the plurality of seeds including: (a) the generated seed for generation of the first plurality of the random numbers to be applied in the scrambling process of the scramble processing section; and (b) a second, different seed for generation of the second plurality of the random numbers to be applied in the bit position conversion process of the bit position conversion section.

4. The information recording processing apparatus according to claim 1, wherein the recording processing section is configured to record the cryptographic key data recording signal as a physical recording signal, the physical recording signal being different from a pit signal.

5. The information recording processing apparatus according to claim 1, wherein the recording processing section is configured to: (a) encrypt the recording object data with the cryptographic key; (b) record the encrypted recording object data as a pit signal; and (c) record the cryptographic key data recording signal corresponding to the cryptographic key as a physical recording signal, the physical recording signal being different from the pit signal at a position at which the pit signal is recorded.

6. The information recording processing apparatus according to claim 1, wherein the seed generation section is configured to execute an arithmetic operation process based on the received error detection code to generate the seed.

7. An information recording processing apparatus for executing a data recording process, the information recording processing apparatus comprising:
   a seed generation section configured to:
      (a) receive an error detection code corresponding to recording object data, the received error detection code representing any error added to the recording object data; and
      (b) generate a seed based on said received error detection code;
   a random number generation section configured to generate a plurality of random numbers based on the generated seed, wherein at least one of the random numbers is generated using the generated seed as an initial value thereof;
   a bit position conversion section configured to:
      (a) receive scrambled cryptographic key data corresponding to a cryptographic key for the recording object data; and
      (b) execute a bit position conversion process, wherein a first plurality of the random numbers generated by the random number generation section are applied to the scrambled cryptographic key data to obtain bit position conversion data; and
   a recording processing section configured to execute a recording process of a cryptographic key data recording signal, wherein the cryptographic key data recording signal is generated based on the bit position conversion data obtained by the bit position conversion process.

8. An information reproduction processing apparatus for executing a reproduction process of data recorded as encrypted data on an information recording medium, the information reproduction processing apparatus comprising:
   a seed generation section configured to:
      (a) receive an error detection code corresponding to reproduction object data, the received error detection code representing any error added to the reproduction object data; and
      (b) generate a seed based on said received error detection code;
   a random number generation section configured to generate a plurality of random numbers based on the generated seed, wherein at least one of the random numbers is generated using the generated seed as an initial value thereof;
   a descramble processing section configured to:
      (a) read cryptographic key data from an information recording medium, the cryptographic key data corresponding to a cryptographic key for the reproduction object data; and
      (b) execute a descrambling process for the cryptographic key data read from the information recording medium, wherein a first plurality of the random numbers generated by the random number generation section are applied to the cryptographic key data to obtain descrambled cryptographic key data; and
   a decryption processing section configured to execute a decryption process of the reproduction object data with the cryptographic key generated based on the descrambled cryptographic key data obtained by the descrambling process.

9. The information reproduction processing apparatus according to claim 8, further comprising a bit position conversion section configured to execute a bit position conversion process to obtain bit position conversion data, wherein a second plurality of the random numbers generated by the random number generation section are applied to the cryptographic key data read from the information recording medium, wherein the cryptographic key is generated based on the bit position conversion data obtained by the bit position conversion process.

10. The information reproduction processing apparatus according to claim 9, wherein the seed generation section is configured to generate a plurality of seeds, each of the plurality of seeds being generated based on the received error detection code corresponding to the reproduction object data, the plurality of seeds including: (a) the generated seed for generation of the first plurality of the random numbers to be applied in the descrambling process of the descramble processing section; and (b) a second, different seed for generation of the second plurality of the random numbers to be applied in the bit position conversion process of the bit position conversion section.

11. The information reproduction processing apparatus according to claim 8, further comprising a reading section configured to read the cryptographic key data from a physical recording signal recorded on the information recording medium, the physical recording signal being different from a pit signal recorded on the information recording medium.

12. The information reproduction processing apparatus according to claim 8, further comprising a reading section configured to: (a) read the reproduction object data from a pit signal recorded on the information recording medium; and (b) read the cryptographic key data from a physical recording signal, the physical recording signal being different from the pit signal at a position at which the pit signal is recorded.

13. The information reproduction processing apparatus according to claim 8, wherein the seed generation section is configured to execute an arithmetic operation process based on the received error detection code to generate the seed.

14. An information reproduction processing apparatus for executing a reproduction process of data recorded as encrypted data on an information recording medium, the information reproduction processing apparatus comprising:
   a seed generation section configured to:
      (a) receive an error detection code corresponding to reproduction object data, the received error detection code representing any error added to the reproduction object data; and
      (b) generate a seed based on said received error detection code;
   a random number generation section configured to generate a plurality of random numbers based on the generated seed, wherein at least one of the random numbers is generated using the generated seed as an initial value thereof;
   a bit position conversion section configured to:
      (a) read cryptographic key data from an information recording medium, the cryptographic key data corresponding to a cryptographic key for the reproduction object data; and
      (b) execute a bit position conversion process, wherein a first plurality of the random numbers generated by the random number generation section are applied to the cryptographic key data to obtain bit position conversion; and
   a decryption processing section configured to execute a decryption process of the reproduction object data with the cryptographic key generated based on the bit position conversion data obtained by the bit position conversion process.

15. An information recording processing method for executing a data recording process, the information recording processing method comprising:
   causing a seed generation section to receive an error detection code corresponding to recording object data, the received error detection code representing any error added to the recording object data;
   causing the seed generation section to generate a seed based on said received error detection code;
   causing a random number generation section to generate a plurality of random numbers based on the generated seed, wherein at least one of the random numbers is generated using the generated seed as an initial value thereof;
   causing a scramble processing section to obtain scrambled data by: (a) executing a scrambling process for cryptographic key data corresponding to a cryptographic key for the recording object data; and (b) applying a first plurality of the random numbers to the cryptographic key data; and
   causing a recording processing section to execute a recording process of a cryptographic key data recording signal, wherein the cryptographic key data recording signal is generated based on the obtained scrambled data.

16. The information recording processing method according to claim 15, further comprising: (a) causing a bit position conversion section to obtain bit position conversion data by: (i) receiving scrambled data corresponding to a cryptographic key for the recording object data and (ii) applying a second plurality of the random numbers to the scrambled data and (b) causing the recording processing section to execute the recording process of the cryptographic key data recording signal, wherein the cryptographic key data recording signal is generated based on the obtained bit position conversion data.

17. The information recording processing method according to claim 16, which includes causing the seed generation section to generate a plurality of seeds, each of the plurality of seeds being generated based on the received error detection code corresponding to the recording object data, the plurality of seeds including: (a) the generated seed for generation of the first plurality of the random numbers to be applied by the scramble processing section; and (b) a second, different seed for generation of the second plurality of random numbers to be applied by the bit position conversion section.

18. The information recording processing method according to claim 15, which includes causing the recording processing section to record the cryptographic key data recording signal as a physical recording signal, the physical recording signal being different from a pit signal.

19. The information recording processing method according to claim 15, which includes causing the recording processing section to: (a) encrypt the recording object data with the cryptographic key; (b) record the encrypted recording object data as a pit signal; and (c) record the cryptographic key data recording signal corresponding to the cryptographic key as a physical recording signal, the physical recording signal being different from the pit signal at a position at which the pit signal is recorded.

20. The information recording processing method according to claim 15, wherein the seed generation step is configured to execute an arithmetic operation process based on the received error detection code to generate the seed.

21. An information recording processing method for executing a data recording process, the information recording processing method comprising:
   causing a seed generation section to receive an error detection code corresponding to recording object data, the received error detection code representing any error added to the recording object data;
   causing the seed generation section to generate a seed based on said received error detection code;
   causing a random number generation section to generate a plurality of random numbers based on the generated seed, wherein at least one of the random numbers is generated using the generated seed as an initial value thereof;
   causing a bit position conversion section to obtain bit position conversion data by: (a) receiving scrambled cryptographic key data corresponding to a cryptographic key for the recording object data; and (b) applying a first plurality of the random numbers generated by the random number generation section to the scrambled cryptographic key data; and
   causing a recording processing section to execute a recording process of a cryptographic key data recording signal, wherein the cryptographic key data recording signal is generated based on the bit position conversion data obtained by the bit position conversion section.

22. An information reproduction processing method for executing a reproduction process of data recorded as encrypted data on an information recording medium, the information reproduction processing method comprising:
   causing a seed generation section to receive an error detection code corresponding to reproduction object data, the received error detection code representing any error added to the reproduction object data;

causing the seed generation section to generate a seed based on said received error detection code;

causing a random number generation section to generate a plurality of random numbers based on the generated seed, wherein at least one of the random numbers is generated using the generated seed as an initial value thereof;

causing a descramble processing section to obtain descrambled cryptographic key data by: (a) reading cryptographic key data from an information recording medium, the cryptographic key data corresponding to a cryptographic key for the reproduction object data; and (b) applying a first plurality of the random numbers generated by the random number generation section to the cryptographic key data; and causing a decryption processing section to execute a decryption process of the reproduction object data with the cryptographic key generated based on the descrambled cryptographic key data obtained by the descramble processing section.

23. The information reproduction processing method according to claim 22, further comprising: (a) causing a bit position conversion section to obtain bit position conversion data by applying a second plurality the random numbers generated by the random number generation section to the cryptographic key data read from the information recording medium; and (b) causing the decryption processing section to execute the decryption process of the reproduction object data with the cryptographic key generated based on the bit position conversion data obtained by the bit position conversion section.

24. The information reproduction processing method according to claim 23, which includes causing the seed generation section to generate a plurality of seeds, each of the plurality of seeds being generated based on the received error detection code corresponding to the reproduction object data, the plurality of seeds including: (a) the generated seed for generation of the first plurality of the random numbers to be applied by the descramble processing section; and (b) a second, different seed for generation of the second plurality of the random numbers to be applied by the bit position conversion section.

25. The information reproduction processing method according to claim 22, further comprising causing a reading section to read the cryptographic key data from a physical recording signal recorded on the information recording medium, the physical recording signal being different from a pit signal recorded on the information recording medium.

26. The information reproduction processing method according to claim 22, further comprising causing a reading section to read the reproduction object data from a pit signal recorded on the information recording medium; and causing the reading section to read the cryptographic key data from a physical recording signal, the physical recording signal being different from the pit signal at a position at which the pit signal is recorded.

27. The information reproduction processing method according to claim 15, wherein the seed generation step executes an arithmetic operation process based on the received error detection code to generate the seed.

28. An information reproduction processing method for executing a reproduction process of data recorded as encrypted data on an information recording medium, the information reproduction processing method comprising:

causing a seed generation section to receive an error detection code corresponding to reproduction object data, the received error detection code representing any error added to the reproduction object data;

causing the seed generation section to generate a seed based on the received error detection code;

causing a random number generation section to generate a plurality of random numbers based on the generated seed, wherein at least one of the random numbers is generated using the generated seed as an initial value thereof;

causing a bit position conversion section to obtain bit position conversion data by: (a) reading cryptographic key data from an information recording medium, the cryptographic key data corresponding to a cryptographic key for the reproduction object data; and (b) applying a first plurality of the random numbers generated by the random number generation section to the cryptographic key data; and causing a decryption processing section to execute a decryption process of the reproduction object data with the cryptographic key generated based on the bit position conversion data obtained by the bit position conversion section.

29. A non-transitory computer readable medium storing a computer program for executing a data recording process, said computer program structured to cause an apparatus to:

receive an error detection code corresponding to recording object data, the received error detection code representing any error added to the recording object data;

generate a seed based on said received error detection code;

generate a plurality of random numbers based on the generated seed, wherein at least one of the random numbers is generated using the generated seed as an initial value thereof;

execute a scrambling process for cryptographic key data corresponding to a cryptographic key for the recording object data, wherein the generated random numbers are applied to the cryptographic key to obtain scrambled cryptographic key data; and execute a recording process of a cryptographic key data recording signal generated based on the scrambled cryptographic key data.

30. A non-transitory computer readable medium storing a computer program for executing a reproduction process of data recorded as encrypted data on an information recording medium, said computer program structured to cause an apparatus to:

receive an error detection code corresponding to reproduction object data, the received error detection code representing any error added to the reproduction object data;

generate a seed based on the received error detection code;

generate a plurality of random numbers based on the generated seed, wherein at least one of the random numbers is generated using the generated seed as an initial value thereof;

execute a descrambling process for cryptographic key data read from the information recording medium and corresponding to a cryptographic key for the reproduction object data, wherein the generated random numbers are applied to the cryptographic key to obtain descrambled cryptographic key data; and execute a decryption process of the reproduction object data with the cryptographic key generated based on the descrambled cryptographic key data.

* * * * *